United States Patent
Tsukioka

(10) Patent No.: US 9,704,222 B2
(45) Date of Patent: Jul. 11, 2017

(54) IMAGE PROCESSING APPARATUS

(71) Applicant: OLYMPUS CORPORATION, Shibuya-ku, Tokyo (JP)

(72) Inventor: Taketo Tsukioka, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/979,369

(22) Filed: Dec. 22, 2015

(65) Prior Publication Data

US 2016/0132996 A1 May 12, 2016

Related U.S. Application Data

(63) Continuation of application No. PCT/JP2014/067030, filed on Jun. 26, 2014.

(30) Foreign Application Priority Data

Jun. 26, 2013 (JP) ................. 2013-133901

(51) Int. Cl.
*G06K 9/00* (2006.01)
*G06T 5/00* (2006.01)
(Continued)

(52) U.S. Cl.
CPC ................. *G06T 5/00* (2013.01); *G06K 9/46* (2013.01); *G06T 5/002* (2013.01); *G06T 5/20* (2013.01);
(Continued)

(58) Field of Classification Search
CPC .. G06T 5/00; G06T 5/002; G06T 5/20; G06T 2207/20182; G06K 9/46; G06K 9/525; G06F 17/30321; H04N 1/409; H04N 2209/046; H04N 2209/047
See application file for complete search history.

(56) References Cited

U.S. PATENT DOCUMENTS

| | | | |
|---|---|---|---|
| 8,184,183 B2 * | 5/2012 | Shima | H04N 9/045 348/241 |
| 8,837,853 B2 * | 9/2014 | Tachi | H04N 5/217 382/263 |

(Continued)

FOREIGN PATENT DOCUMENTS

| | | |
|---|---|---|
| JP | 2004336652 A | 11/2004 |
| JP | 2008293425 A | 12/2008 |

(Continued)

OTHER PUBLICATIONS

International Serach Report (ISR) dated Sep. 16, 2014 issued in International Application No. PCT/JP2014/067030.

*Primary Examiner* — Ali Bayat
(74) *Attorney, Agent, or Firm* — Holtz, Holtz & Volek PC

(57) ABSTRACT

An image processing apparatus of the present invention includes: a structure index calculation unit that calculates a structure index that is an index of magnitude of variation of a pixel value in a predetermined range around a target pixel of an input image, with respect to each target pixel; a high frequency component extraction unit that extracts a high frequency structure index that is a high frequency component of the structure index; a smoothing unit that calculates a smoothed structure index obtained by smoothing the structure index, with respect to the each target pixel; a flatness index calculation unit that calculates a synthesis index obtained by synthesizing the smoothed structure index and the high frequency structure index, as a flatness index of the target pixel; and a noise reduction unit that performs a noise reduction process of the target pixel in accordance with the flatness index.

7 Claims, 16 Drawing Sheets

(51) Int. Cl.
*H04N 1/409* (2006.01)
*G06K 9/46* (2006.01)
*G06T 5/20* (2006.01)

(52) U.S. Cl.
CPC ... *H04N 1/409* (2013.01); *G06T 2207/20182* (2013.01)

(56) References Cited

U.S. PATENT DOCUMENTS

| | | | |
|---|---|---|---|
| 8,948,506 B2 * | 2/2015 | Saito | H04N 9/045 382/162 |
| 9,025,903 B2 * | 5/2015 | Wada | G06T 5/002 382/254 |
| 9,485,410 B2 * | 11/2016 | Izawa | G03B 17/20 |
| 2007/0110329 A1 | 5/2007 | Moon et al. | |
| 2009/0116762 A1 | 5/2009 | Lin | |
| 2010/0119163 A1 | 5/2010 | Inoue | |
| 2011/0285871 A1 | 11/2011 | Sakai | |
| 2013/0077862 A1 * | 3/2013 | Nomura | H04N 9/045 382/167 |

FOREIGN PATENT DOCUMENTS

| | | |
|---|---|---|
| JP | 4635779 B2 | 2/2011 |
| JP | 4677488 B2 | 4/2011 |
| JP | 2011248479 A | 12/2011 |
| JP | 2013026698 A | 2/2013 |
| WO | 2006132633 A1 | 12/2006 |
| WO | 2008105222 A1 | 9/2008 |

* cited by examiner

| -1 | -1 | -1 |
|----|----|----|
| -1 | 8  | -1 |
| -1 | -1 | -1 |

ORIGINAL SIGNAL

SIGNAL AFTER NOISE MIXTURE

HIGH FREQUENCY OF FIG. 5B

STRUCTURE INDEX
(WITHOUT SMOOTHED)

HIGH FREQUENCY CORING RESULT

FINAL SIGNAL AFTER
NOISE REDUCTION

STRUCTURE INDEX (SMOOTHED)

STRUCTURE INDEX
(WITHOUT SMOOTHED)

RANGE DETERMINED AS
NO FLATNESS FROM FIG. 6A

RANGE DETERMINED AS
NO FLATNESS FROM FIG. 6B

HIGH FREQUENCY CORING
RESULT BASED ON FIG. 6C

HIGH FREQUENCY CORING
RESULT BASED ON FIG. 6D

FINAL SIGNAL AFTER NOISE
REDUCTION IN CASE OF USING FIG. 6A

FINAL SIGNAL AFTER NOISE
REDUCTION IN CASE OF USING FIG. 6B

STRUCTURE INDEX (SMOOTHED)

STRUCTURE INDEX (AFTER CORRECTION)

RANGE DETERMINED AS NO FLATNESS FROM FIG. 7A

RANGE DETERMINED AS NO FLATNESS FROM FIG. 7B

HIGH FREQUENCY CORING
RESULT BASED ON FIG. 7C

HIGH FREQUENCY CORING
RESULT BASED ON FIG. 7D

FINAL SIGNAL AFTER NOISE
REDUCTION IN CASE OF USING FIG. 7A

FINAL SIGNAL AFTER NOISE
REDUCTION IN CASE OF USING FIG. 7B

SIGNAL BEFORE NOISE ADDITION

SIGNAL AFTER NOISE ADDITION

STRUCTURE INDEX D

SMOOTHED STRUCTURE INDEX Da OBTAINED
BY SMOOTHING STRUCTURE INDEX

D/Da (METHOD OF PTL 3)

Da + 0.5*(D − Da)
(METHOD OF THIS EMBODIMENT)

STRUCTURE INDEX
(AFTER CORRECTION BY EXPRESSION 9)

STRUCTURE INDEX
(AFTER CORRECTION BY EXPRESSION 10)

RANGE DETERMINED AS
NO FLATNESS FROM FIG. 11A

RANGE DETERMINED AS
NO FLATNESS FROM FIG. 11B

HIGH FREQUENCY CORING
RESULT BASED ON FIG. 11C

HIGH FREQUENCY CORING
RESULT BASED ON FIG. 11D

FINAL SIGNAL AFTER NOISE
REDUCTION IN CASE OF USING FIG. 11A

FINAL SIGNAL AFTER NOISE
REDUCTION IN CASE OF USING FIG. 11B

| 1 | 2 | 1 |
|---|---|---|
| 2 | 4 | 2 |
| 1 | 2 | 1 | /16

IMAGE PROCESSING APPARATUS

CROSS REFERENCE TO RELATED APPLICATIONS

This is a continuation of International Application PCT/JP2014/067030, with an international filing date of Jun. 26, 2014, which is hereby incorporated by reference herein in its entirety. This application claims the benefit of Japanese Patent Application No. 2013-133901, filed on Jun. 26, 2013, the content of which is incorporated herein by reference.

TECHNICAL FIELD

The present invention relates to an image processing apparatus which reduces noise in accordance with a determination result as to whether the periphery of a target pixel of an image is an edge or flatness.

BACKGROUND ART

Conventionally, various methods of removing noise of a flat part while maintaining an edge by evaluating the degree of local unevenness of an image signal to weaken and strengthen noise reduction in accordance with an evaluation result when the noise of the image signal is removed have been proposed.

For example, PTL 1 discloses that the intensity of local edges in a plurality of directions around a target pixel is examined, so that flatness indicating whether the periphery of the target pixel is flat or has a strong edge is calculated, and a high frequency coring threshold value is controlled in accordance with the calculated flatness. In the technology disclosed in PTL 1, in a case where a range in which the intensity of an edge is examined is limited to peripheral pixels around a target pixel, an influence of noise becomes greater.

PTL 2 discloses a technology of obtaining the local unevenness (dispersion value) of an image signal, and discriminating between a flat part and an edge part or a texture part on the basis of a result obtained by smoothing the obtained local unevenness. In a case of the technology disclosed in PTL 2, the unevenness of a low frequency due to noise appears in the determination result by smoothing. When such a determination result is used for a noise reduction process, particularly in a low contrast texture part, large scale nonuniformity of texture reproduction occurs because of the low frequency of the determination result.

PTL 3 discloses a technology of adjusting the intensity of noise reduction on the basis of the ratio of a smoothed dispersion value obtained by smoothing a local dispersion value and a local dispersion value. In the technology disclosed in PTL 3, in a part where the local dispersion value is larger than the smoothed dispersion value, the intensity of noise reduction is weak, and in a part where the local dispersion value is smaller than the smoothed dispersion value, the intensity of noise reduction is strong. However, in the part where the local dispersion value is larger than the smoothed dispersion value, the structure is likely to remain during the noise reduction process, and in the part where the local dispersion value is smaller than the smoothed dispersion value, the structure is originally unlikely to relatively remain in the noise reduction process. Therefore, when control of weakening the noise reduction intensity of the former, and strengthening the noise reduction intensity of the latter is performed, a difference between a part where the structure remains and a part where the structure is broken in a low contrast part becomes large.

CITATION LIST

Patent Literature

{PTL 1} Japanese Unexamined Patent Application, Publication No. 2008-293425
{PTL 2} the Publication of Japanese Patent No. 4635779
{PTL 3} the Publication of Japanese Patent No. 4677488

SUMMARY OF INVENTION

An aspect of the present invention includes: a structure index calculation unit that calculates a structure index that is an index of magnitude of variation of a pixel value in a predetermined region around a target pixel of an input image, with respect to each target pixel; a high frequency component extraction unit that extracts a high frequency structure index that is a high frequency component of the structure index; a smoothing unit that calculates a smoothed structure index obtained by smoothing the structure index, with respect to the each target pixel; a flatness index calculation unit that calculates a synthesis index obtained by synthesizing the smoothed structure index and the high frequency structure index, as a flatness index of the target pixel; and a noise reduction unit that performs a noise reduction process of the target pixel in accordance with the flatness index.

DESCRIPTION OF EMBODIMENTS

First Embodiment

Hereinafter, an image processing apparatus according to a first embodiment of the present invention will be described with reference to the drawings. Herein, an example in which the image processing apparatus according to this embodiment is applied to a digital camera will be described.

Figure 1:
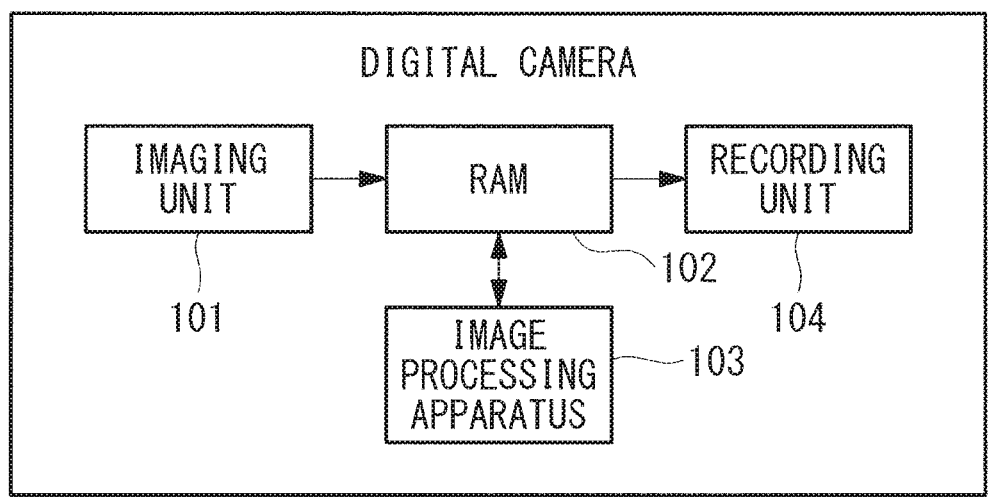
FIG. 1 is a block diagram illustrating a schematic configuration of a digital camera to which an image processing apparatus according to a first embodiment of the present invention is applied.

As illustrated in FIG. 1, the digital camera includes an imaging unit 101 that acquires, for example, a single plate image as an image of an object, a RAM 102 that temporarily stores the single plate image acquired by the imaging unit 101, an image processing apparatus 103 that performs a later-described process to the image stored in the RAM 102, and a recording unit 104 that records the image to which a predetermined image process is performed, in addition to the image process performed by the image processing apparatus 103.

Figure 2:
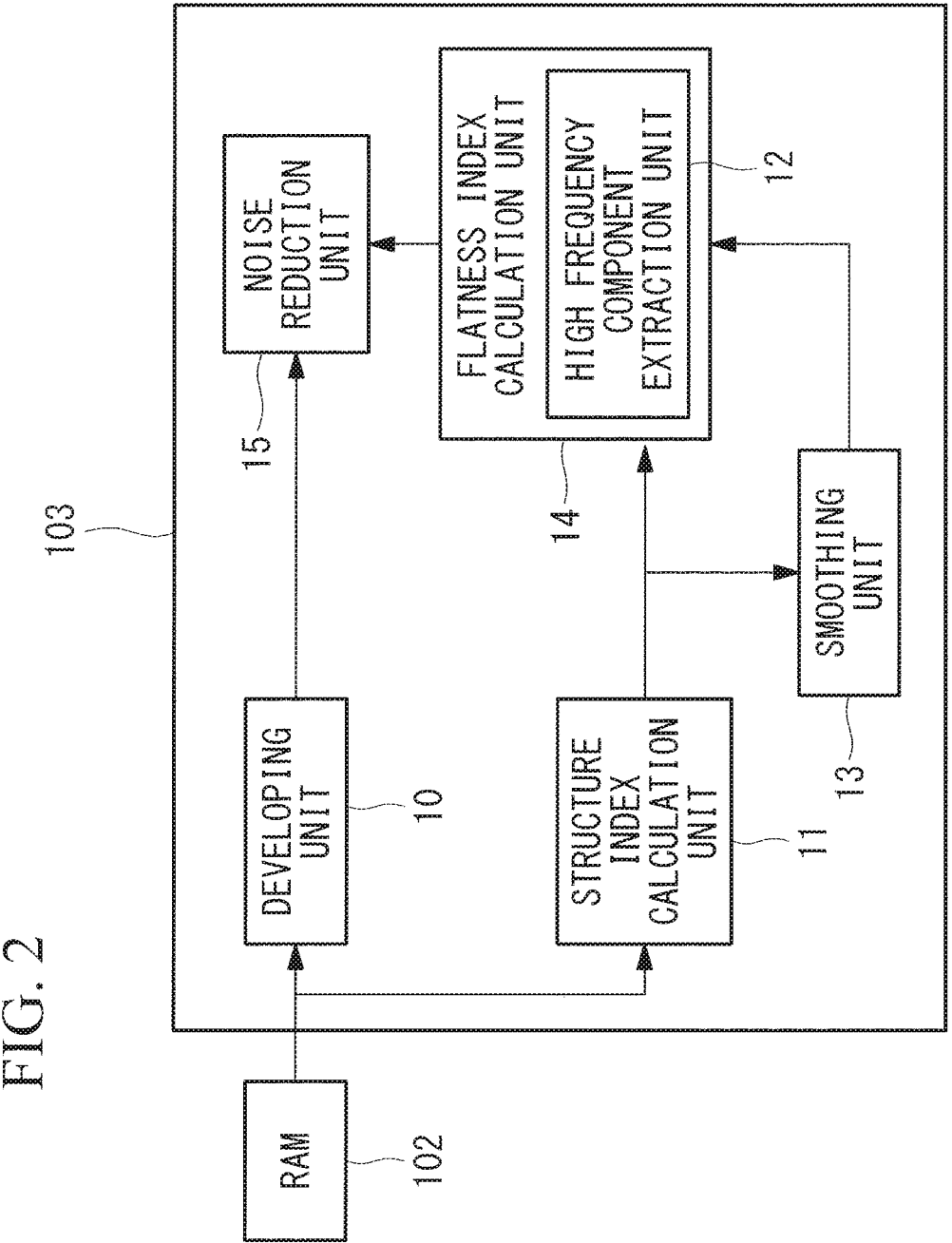
FIG. 2 is a block diagram illustrating a schematic configuration of the image processing apparatus according to the first embodiment of the present invention.

The image processing apparatus 103 performs various processes to an image V (x, y) recorded in the RAM 102, and outputs a final image to the recording unit 104. Therefore, as illustrated in FIG. 2, the image processing apparatus 103 includes a developing unit 10 that performs a developing process to the image recorded in the RAM 102, a structure index calculation unit 11 that calculates a structure index for each target pixel of an input image input from the RAM 102, a high frequency component extraction unit 12 that extracts a high frequency component from the structure index, a smoothing unit 13 that smooths the structure indices, a flatness index calculation unit 14 that calculates a flatness index indicating the flatness of the target pixel, and a noise reduction unit 15 that performs a noise reduction process of the target pixel in accordance with the flatness index.

The developing unit 10 reads out the single plate image stored in the RAM 102, performs the developing process including white balance correction, demosaicing, color correction and gradation correction as needed, and outputs an image signal U(x, y), which is a development result, to the noise reduction unit 15.

Figures 12, 13:
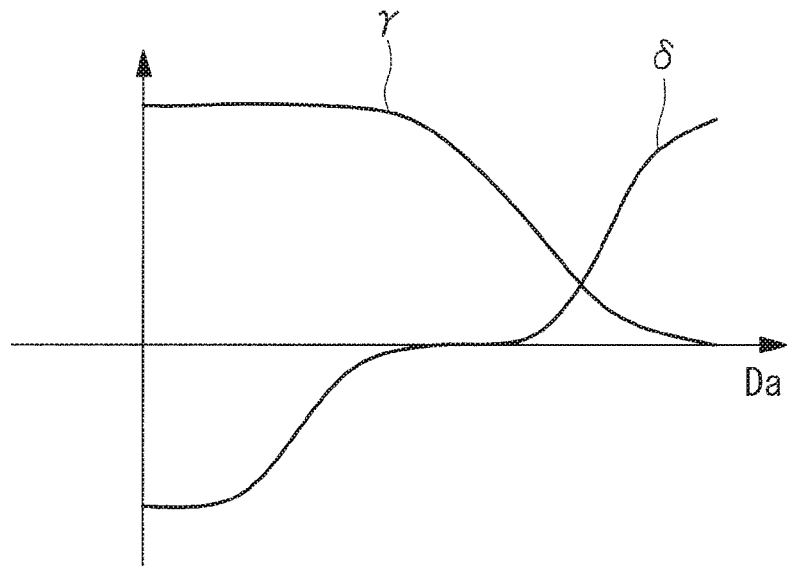
FIG. 12 is an explanatory diagram according to an example of a case where the flatness index is changed in accordance with the magnitude of a smoothed structure index Da, in the image processing apparatus according to the second embodiment of the present invention.
FIG. 13 is a diagram illustrating an example of a low-pass filter (LPF) used when the structure index is calculated, in the image processing apparatus according to the first embodiment of the present invention.

The structure index calculation unit 11 applies an LPF (low-pass filter) illustrated in FIG. 13 to the single plate image stored in the RAM 102, and thereafter calculates a structure index D(x, y) with respect to the target pixel of the obtained image. The structure index D(x, y) is an index of variation of the pixel values in the neighborhood of the target pixel. That is, the structure index calculation unit 11 evaluates the amount of the unevenness of the pixel values around each pixel of the input image, calculates the evaluation result as the structure index of each pixel, and outputs the structure index to the high frequency component extraction unit 12 and the smoothing unit 13.

As the LPF to be applied to the single plate image, the LPF illustrated in FIG. 13 is an example, and other LPF can be applied.

As the structure index D(x, y), a value calculated by various known methods can be used. For example, as illustrated in the following Expression (1), an absolute value of a value obtained by applying a Laplacian filter (refer to FIG. 3) L(x, y) to the image V(x, y) may be uses as the structure index D(x, y).

$$D(x,y)=|\Sigma\Sigma L(p,q)*V(x+p,y+q)| \quad (1)$$

where $-1 \leq p$, and $q \leq 1$ are satisfied.

Alternatively, as illustrated in the following Expression (2), a value equivalent to local dispersion may be used as the structure index D(x, y).

$$D(x,y)=\Sigma\Sigma|V(x+p,y+q)-A(x,y)| \quad (2)$$

$$A(x,y)=\Sigma\Sigma V(x+p,y+q)/(N*N)$$

where $-N/2 \leq p$, and $q \leq N/2$ are satisfied.

In a case where the image is a single plate image, the image is appropriately converted into a luminance image, and thereafter the above calculation is performed.

The high frequency component extraction unit 12 extracts a high frequency structure index which is a high frequency component of the structure index D(x, y). That is, the high frequency component extraction unit 12 calculates an index obtained by deducting a smoothed structure index Da(x, y), described later, from the structure index D(x, y) as the high frequency structure index. In this embodiment, the extraction of the high frequency component is performed by the flatness index calculation unit 14 described later. Therefore, an example in which the high frequency component extraction unit 12 is included in the flatness index calculation unit 14 is illustrated in FIG. 2.

The smoothing unit 13 calculates the smoothed structure index Da(x, y) obtained by smoothing the structure indices D(x, y). That is, the smoothing unit 13 performs spatial smoothing to the structure indices D(x, y), calculates the smoothed structure index Da(x, y), and outputs the calculated smoothed structure index Da(x, y) to the flatness index calculation unit 14.

Similarly, as the smoothing, a known method can be used. For example, as illustrated in the following Expression (3), simple smoothing may be used.

$$Da(x,y)=\Sigma\Sigma D(x+p,y+q)/(N*N) \quad (3)$$

where, $-N/2 \leq p$, and $q \leq N/2$ are satisfied.

Alternatively, weighted smoothing or the like may be used.

The flatness index calculation unit 14 calculates a synthesis index obtained by synthesizing the smoothed structure index Da(x, y) and the high frequency structure index {D(x, y)−Da (x, y)} as a flatness index F(x, y) of a target pixel. The calculated flatness index F(x, y) is output to the noise reduction unit 15.

The smaller flatness index F(x, y) indicates a flatter part and the larger flatness index F(x, y) indicates a higher contrast edge part. An intermediate value of the flatness index F(x, y) indicates a texture of a range from low contrast to intermediate contrast, or an edge. Therefore, the flatness index F(x, y) can discriminate between the flat part and the low contrast texture/edge part. The details will be described later.

A noise reduction unit 15 performs a noise reduction process of the target pixel in accordance with the flatness index F(x, y). That is, the noise reduction unit 15 performs a noise reduction process to an output result U(x, y) of the developing unit 10 by using the flatness index F(x, y) received from the flatness index calculation unit 14.

As the noise reduction process, there is a method of dividing an image U(x, y) into a low frequency component UL(x, y) and a high frequency component UH(x, y) to perform a known coring process to the high frequency component UH(x, y), and thereafter synthesizing the high frequency component obtained after the coring process and the low frequency component again.

As a method of dividing an image into frequency components, various known methods can be used. For example, there is a method of filtering image U(x, y) by a low-pass filter l(x, y) to obtain the low frequency component UL(x, y), and obtaining the high frequency component UH(x, y) as a difference between an original image U(x, y) and the low frequency component UL(x, y), as in the following Expression (4).

$$UL(x,y) = \Sigma\Sigma U(x+p, y+q) * l(p,q) \quad (4)$$

$$UH(x,y) = U(x,y) - UL(x,y) \quad (5)$$

That is, an image Un(x, y) obtained after the noise reduction is calculated according to the following Expression (6).

$$Un(x,y) = UL(x,y) + \text{coring}(UH(x,y), t) \quad (6)$$

Figures 3, 4:
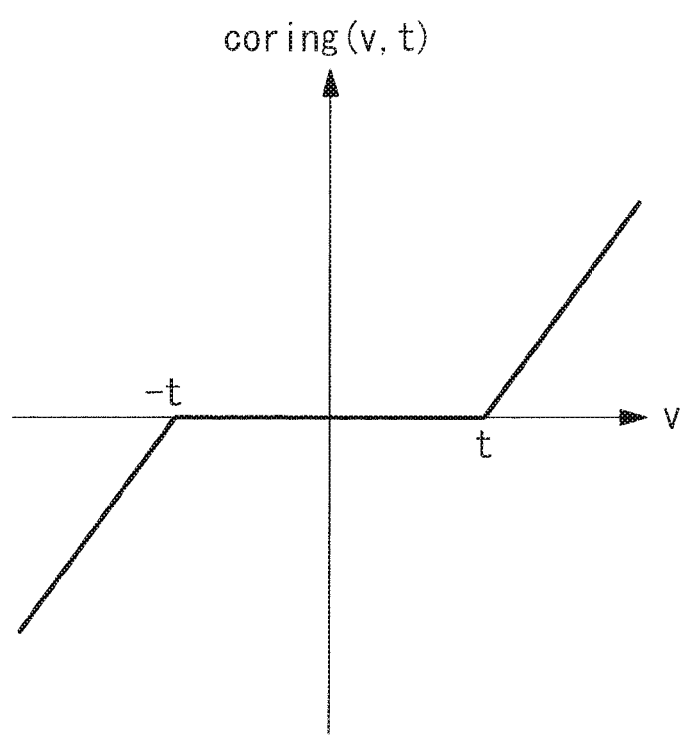
FIG. 3 illustrates an example of a Laplacian filter when a structure index is calculated, in the image processing apparatus according to the first embodiment of the present invention.
FIG. 4 is an explanatory diagram when a coring process is performed, in the image processing apparatus according to the first embodiment of the present invention.

Herein, coring(v, t) is a function for performing coring by a threshold value t, and converts such that a range, in which a value is the absolute value t of v or less, is maintained at 0, and continuity is maintained in other ranges, as illustrated in FIG. 4. As a result, the final result Un(x, y) is a result obtained by removing a high frequency of amplitude of the threshold value t or less from U(x, y). Herein, when the threshold value t is set to be larger than the amplitude of a noise component mixed in U(x, y), the noise component mixed in U(x, y) can be removed to a certain degree.

However, in a case where the amplitude of the noise component is large, the threshold value t has to be increased in order to remove the noise by this method, which causes a problem that the high frequency component of the low contrast edge of U(x, y) which is likely to be less than the threshold value t is almost removed.

In this embodiment, in the above Expression (6), the threshold value t is controlled at each position of the image on the basis of the flatness index F(x, y) obtained by the flatness index calculation unit 14.

For example, $$\text{when } F(x,y) < Tf \text{ is satisfied, } t = t0 \text{ is established} \quad (7)$$

where, Tf is a predetermined threshold value.

$$\text{In other cases, } t = 0 \text{ is established} \quad (8)$$

In such control, most of the high frequency components UH(x, y) are converted into 0 at a portion where F(x, y) is small and is determined as a flat part. Consequently, noise included in the high frequency component in the flat part is removed, and the high frequency component is not removed at all at a portion where F(x, y) is large and is determined as an edge. Therefore, it is possible to achieve both noise removal at the flat part and the preservation of the low contrast edge.

Herein, in the noise reduction unit 15, a problem in a case where the structure index D(x, y) and the smoothed structure index Da(x, y) are directly used in a noise reduction process will be described with reference to FIGS. 5A to 6H. Hereinafter, for simplification, an object to be processed is not an image but one-dimensional signal.

Figure 5A:
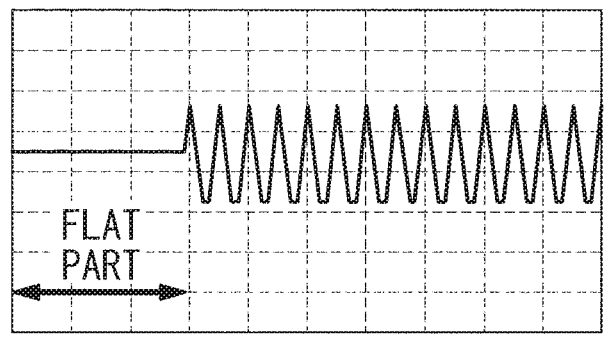
FIG. 5A is a diagram illustrating a process of a noise reduction controlled by a structure index, in the image processing apparatus according to the first embodiment of the present invention.
Figure 5B:
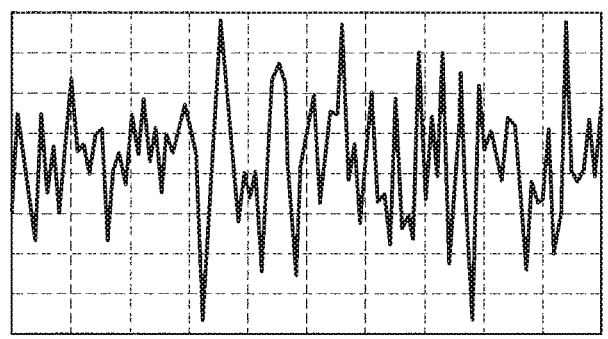
FIG. 5B is a diagram illustrating a process of a noise reduction controlled by a structure index, in the image processing apparatus according to the first embodiment of the present invention.
Figure 5C:
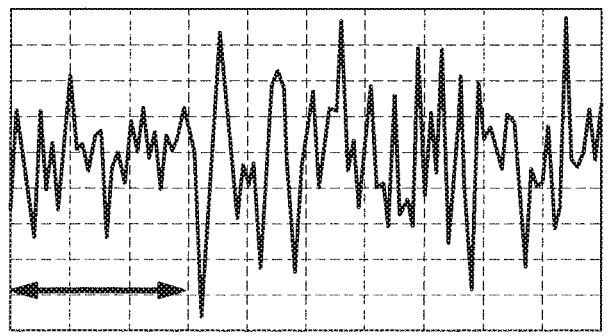
FIG. 5C is a diagram illustrating a process of a noise reduction controlled by a structure index, in the image processing apparatus according to the first embodiment of the present invention.
Figure 5D:
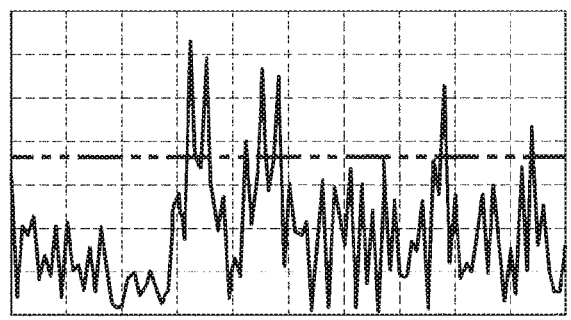
FIG. 5D is a diagram illustrating a process of a noise reduction controlled by a structure index, in the image processing apparatus according to the first embodiment of the present invention.

FIG. 5A illustrates a signal before noise superimposition, FIG. 5B illustrates a signal obtained by superimposing noise on the signal illustrated in FIG. 5A, and FIG. 5C illustrates a signal obtained by performing the noise reduction of the signal illustrated in FIG. 5B by directly using a structure index D. FIG. 5D illustrates the calculated structure index D. Like this example, the structure index is an index for detecting the unevenness of a signal, and therefore is largely affected by noise. FIG. 5C illustrates the high frequency component of the signal illustrated in FIG. 5B which includes noise. The high frequency component originally does not exist in a flat part on the left side of an original signal. However, the high frequency component is found in FIG. 5C due to the influence of noise.

In order to remove the high frequency component at the original flat part as much as possible by the above coring process, a threshold value T (illustrated by a two-dot chain line in FIG. 5D) equal to or more than the maximum value of the structure index at the flat part is set, and then discrimination is performed such that a part where a structure index D(x, y) is equal to or more the threshold value T is an edge or a structure part, and a part where an structure index D(x, y) is less than the threshold value T is a flat part. Then, in the flat part, a threshold value being at least the maximum value of a high frequency absolute value at the flat part section, illustrated in FIG. 5C, is set to a coring threshold value, so that a coring process is performed.

Figure 5E:
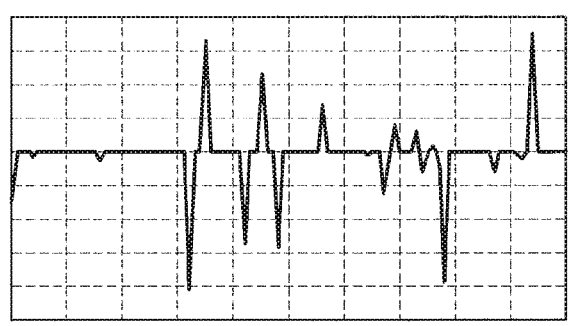
FIG. 5E is a diagram illustrating a process of a noise reduction controlled by a structure index, in the image processing apparatus according to the first embodiment of the present invention.
Figure 5F:
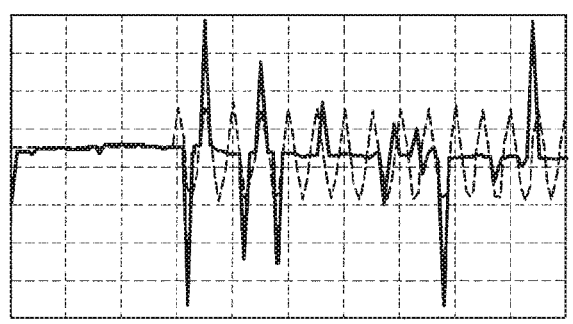
FIG. 5F is a diagram illustrating a process of a noise reduction controlled by a structure index, in the image processing apparatus according to the first embodiment of the present invention.

The high frequency component after this coring process is illustrated in FIG. 5E, and a final synthesis result of the processed high frequency component and the low frequency component of the original signal is illustrated in FIG. 5F. As can be seen from these results, it is difficult to stably determine an edge or a structural part even in a part where a structure exists in an input image by using the structure index D(x, y) largely influenced by noise. Therefore, structure remains only in a part where noise amplitude is large among the parts which originally have structures. As a result, this causes an unnatural processing results.

Figure 6A:
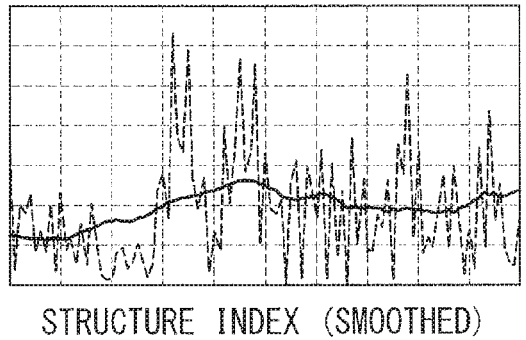
FIG. 6A is a diagram illustrating a process of a noise reduction controlled by a smoothed structure index, in the image processing apparatus according to the first embodiment of the present invention.
Figure 6B:
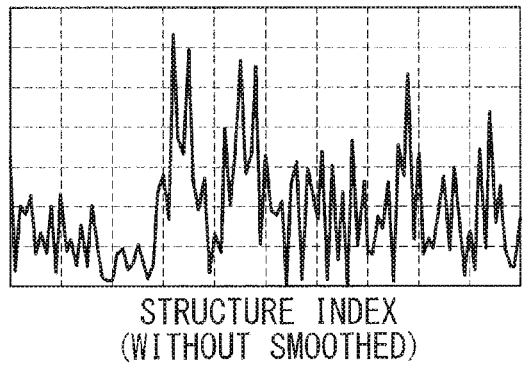
FIG. 6B is a diagram illustrating a process of a noise reduction controlled by a smoothed structure index, in the image processing apparatus according to the first embodiment of the present invention.
Figure 6C:
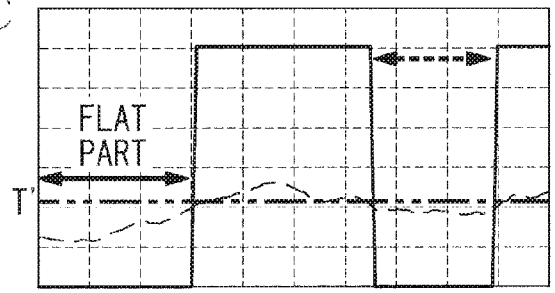
FIG. 6C is a diagram illustrating a process of a noise reduction controlled by a smoothed structure index, in the image processing apparatus according to the first embodiment of the present invention.
Figure 6D:
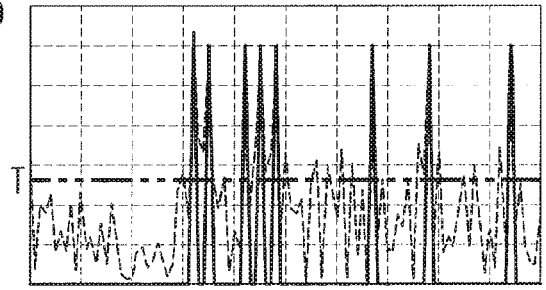
FIG. 6D is a diagram illustrating a process of a noise reduction controlled by a smoothed structure index, in the image processing apparatus according to the first embodiment of the present invention.
Figure 6E:
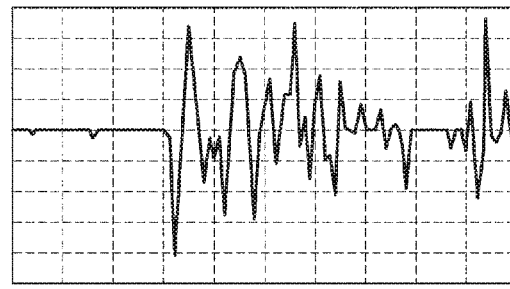
FIG. 6E is a diagram illustrating a process of a noise reduction controlled by a smoothed structure index, in the image processing apparatus according to the first embodiment of the present invention.
Figure 6F:
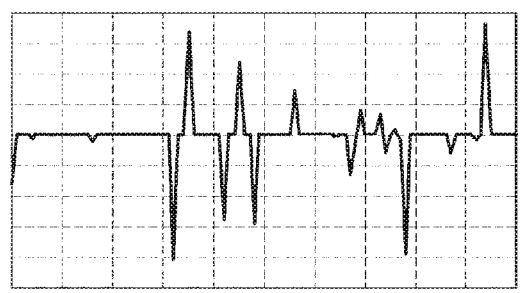
FIG. 6F is a diagram illustrating a process of a noise reduction controlled by a smoothed structure index, in the image processing apparatus according to the first embodiment of the present invention.
Figure 6G:
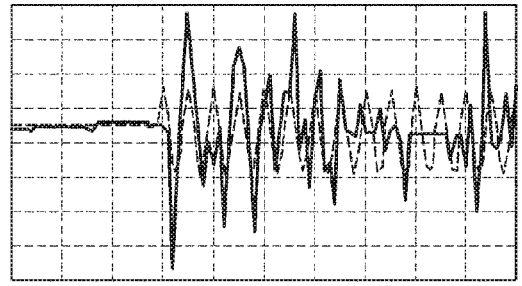
FIG. 6G is a diagram illustrating a process of a noise reduction controlled by a smoothed structure index, in the image processing apparatus according to the first embodiment of the present invention.
Figure 6H:
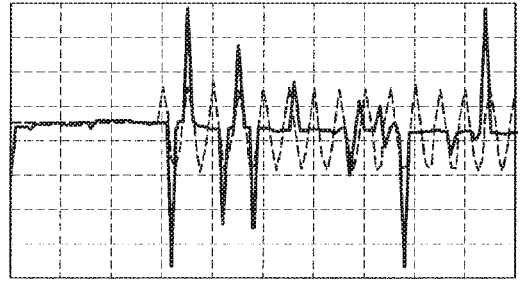
FIG. 6H is a diagram illustrating a process of a noise reduction controlled by a smoothed structure index, in the image processing apparatus according to the first embodiment of the present invention.

On the contrary, an example in which a similar process is performed by using a smoothed structure index Da is illustrated in FIGS. 6A to 6H. FIG. 6A illustrates the smoothed structure index Da in contrast to an index before smoothed (dotted line). From this, it is found that influence by noise is largely decreased. A threshold value T' (illustrated by a two-dot chain line in FIG. 6C) having at least the maximum value of the structure index Da at the flat part is set in a manner similar to FIGS. 5A to 5F. In FIG. 6C, a solid line illustrates a result obtained by discriminating between a flat part and an edge or a structural value, in which a large part is a range which is determined as the edge or the structural value. When a similar result is compared with FIG. 6D in contrast to an index D before smoothed, the range which is determined as the edge or the structure part is continuously spread in a wide range. From this, it is found that the structure can be maintained also in FIG. 6G of a final result, compared to a case of using the index D before smoothed.

However, a range which is determined as a flat part despite having a structure becomes also continuous as illustrated by a dotted arrow in FIG. 6C, and therefore the structure is broken in the section, which causes large scale unevenness of the structure reproduction.

Thus, in a case where the noise reduction process is controlled by using the smoothed structure index Da, the influence of erroneous determination due to noise is decreased. However, in a case where erroneous determination is performed, the erroneous determination continuously occurs over a certain range. Consequently, there is a problem that low frequency unevenness is generated in the part having the remaining structure.

As described above, in consideration of the problem in a case where the structure index D(x, y) and the smoothed structure index Da(x, y) are directly used in a noise reduction process, a problem that the range in which erroneous determination is performed becomes continuous is relaxed in the flatness index calculation unit 14 by reflecting variation of the high frequency component of the structure index D(x, y) to the smoothed structure index Da(x, y).

Specifically, for example, the flatness index F(x, y) can be calculated by the following Expression (9).

$$F(x,y)=\alpha * Da(x,y)+\beta * (D(x,y)-Da(x,y)) \qquad (9)$$

where α and β each are a positive constant.

As long as the high frequency component of D(x, y) is reflected in the smoothed structure index, the calculation method is not limited to this.

Figure 7A:
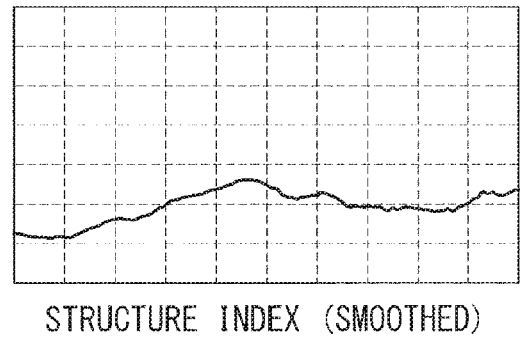
FIG. 7A is a diagram illustrating a process of a noise reduction controlled by a flatness index, in the image processing apparatus according to the first embodiment of the present invention.
Figure 7B:
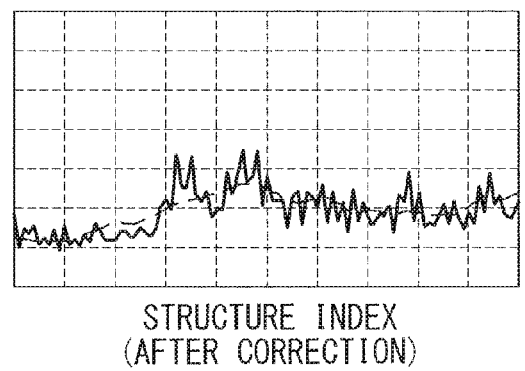
FIG. 7B is a diagram illustrating a process of a noise reduction controlled by a flatness index, in the image processing apparatus according to the first embodiment of the present invention.
Figure 7C:
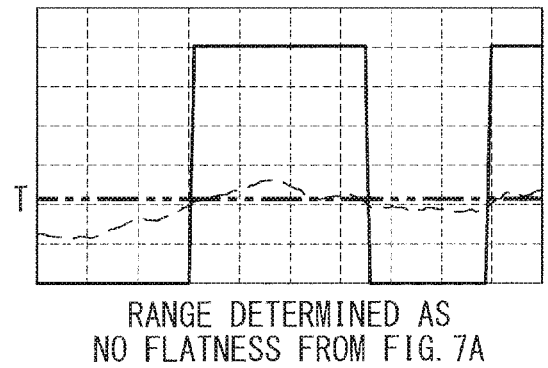
FIG. 7C is a diagram illustrating a process of a noise reduction controlled by a flatness index, in the image processing apparatus according to the first embodiment of the present invention.
Figure 7D:
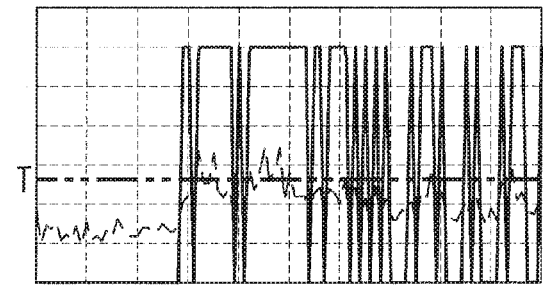
FIG. 7D is a diagram illustrating a process of a noise reduction controlled by a flatness index, in the image processing apparatus according to the first embodiment of the present invention.
Figure 7E:
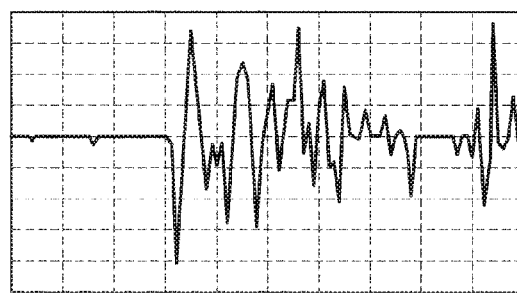
FIG. 7E is a diagram illustrating a process of a noise reduction controlled by a flatness index, in the image processing apparatus according to the first embodiment of the present invention.
Figure 7F:
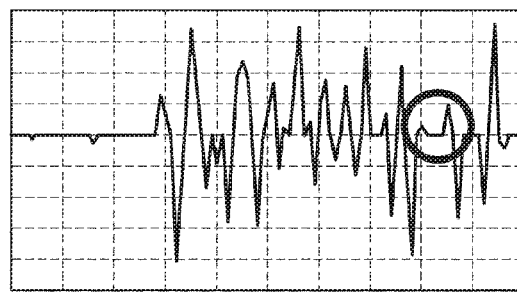
FIG. 7F is a diagram illustrating a condition of noise reduction process control performed by a flatness index, in the image processing apparatus according to the first embodiment of the present invention.
Figure 7G:
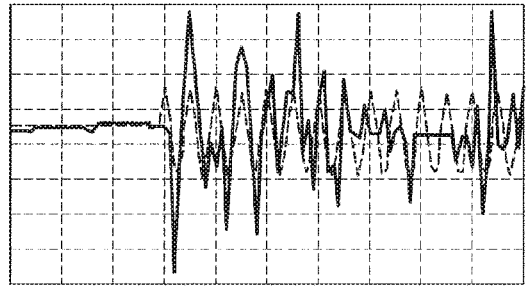
FIG. 7G is a diagram illustrating a process of a noise reduction controlled by a flatness index, in the image processing apparatus according to the first embodiment of the present invention.
Figure 7H:
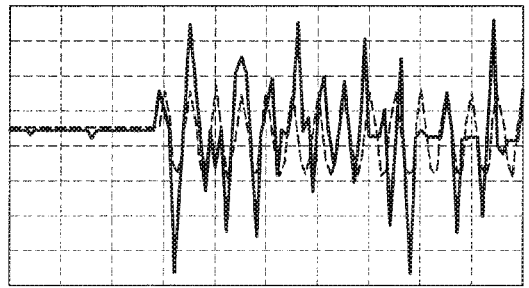
FIG. 7H is a diagram illustrating a process of a noise reduction controlled by a flatness index, in the image processing apparatus according to the first embodiment of the present invention.

An effect by calculating the flatness index F(x. y) in such a manner is illustrated in FIGS. 7A to 7H. FIGS. 7A, 7C, 7E, and 7G are results in a case where the smoothed structure index Da is used, which are similar to FIGS. 6A, 6C, 6E, and 6G. On the contrary, the flatness index F(x, y) calculated by the above Expression (9) is illustrated in FIG. 7B. When similar flatness determination is performed by this flatness index F(x, y), as illustrated in FIG. 7D, the determination result spatially finely varies. As a result, as illustrated by a circle mark in FIG. 7F, a case where the smoothed structure index Da(x, y) is used, a part continuously regarded as a flat part is partially determined as a structure/edge. Similarly, FIG. 7H of a final result is a natural result compared to FIG. 7G which is the final result in a case where the smoothed structure index Da is used.

As described above, according to this embodiment, the structure index for evaluating local unevenness from an image is calculated, and the flatness index obtained by reflecting (for example, weighing and mixing) the high frequency of the structure index before smoothed in the smoothed structure index (general index) obtained by smoothing the structure index is calculated. Then, the smoothed structure index serves as an index for determining a final flatness/structure, and therefore the noise reduction process is performed by using the flatness index, so that a noise reduction result with less influence of erroneous determination due to noise and with more natural appearance is obtained.

This embodiment is common with the above PTL 3 in that the final flatness index F is calculated by using the structure index D for evaluating local unevenness, and the smoothed structure index (general index) Da. However, in PTL 3, D/Da is equivalent to the final flatness index, and the working effect thereof is completely different from that of this embodiment.

In PTL 3, the intensity of noise reduction is adjusted so that the larger the standard deviation coefficient σ2 of a convolution mask is, the stronger the smoothing becomes, while the smaller the standard deviation coefficient σ2 is, the weaker the smoothing becomes. On the other hand, according to the above embodiment, the intensity of noise reduction is adjusted such that the larger the final flatness index F is, the weaker the smoothing becomes, while the smaller the final flatness index F is, the stronger the smoothing becomes, and therefore the flatness index F exactly corresponds to the reciprocal of a standard deviation coefficient σ. σ2=σg2/σ12 is satisfied by Numerical Expression 9 in PTL 3, the dispersion σg2 is equivalent to the smoothed structure index Da in this embodiment, and the dispersion σ12 corresponds to the structure index D in the present application, and therefore an index equivalent to the flatness index F is 1/σ2=σ12/σg2≥D/Da in PTL 3.

Figure 8A:
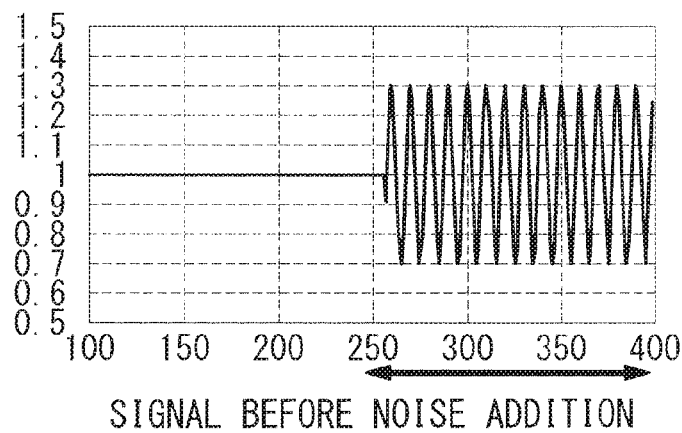
FIG. 8A is an explanatory diagram in which the noise reduction process based on the flatness index in the image processing apparatus according to the first embodiment of the present invention is compared with noise reduction by a conventional flatness index.
Figure 8B:
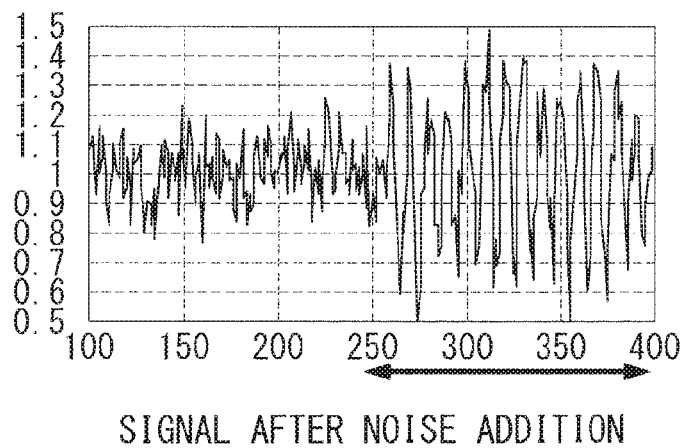
FIG. 8B is an explanatory diagram in which the noise reduction process based on the flatness index in the image processing apparatus according to the first embodiment of the present invention is compared with noise reduction by a conventional flatness index.

FIGS. 8A to 8F illustrate a difference between PTL 3 and this embodiment. FIG. 8A illustrates a signal before noise addition, and FIG. 8B illustrates a signal after noise addition. The range illustrated by the arrow is a structure (texture), and other ranges are flat parts.

Figure 8C:
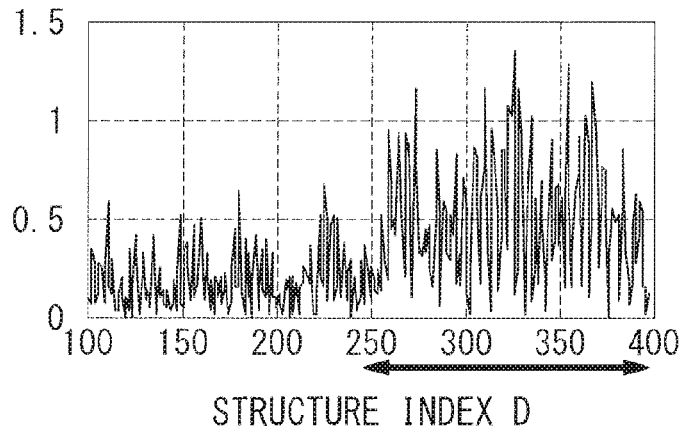
FIG. 8C is an explanatory diagram in which the noise reduction process based on the flatness index in the image processing apparatus according to the first embodiment of the present invention is compared with noise reduction by a conventional flatness index.
Figure 8D:
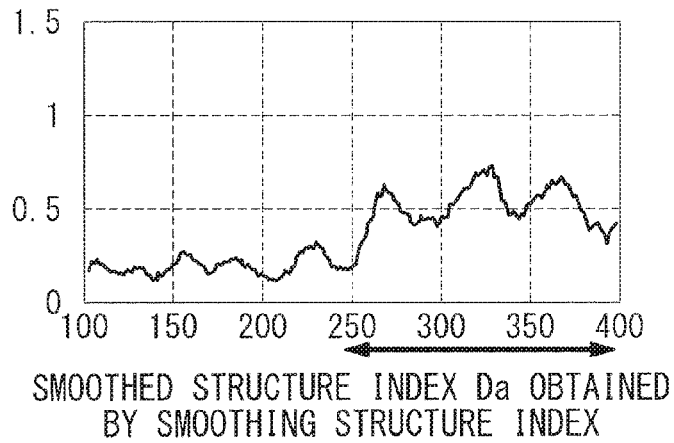
FIG. 8D is an explanatory diagram in which the noise reduction process based on the flatness index in the image processing apparatus according to the first embodiment of the present invention is compared with noise reduction by a conventional flatness index.

An example in which the structure index D is calculated from the signal illustrated in FIG. 8B is illustrated in FIG. 8C, and a smoothed structure index Da obtained by smoothing the structure index D is illustrated in FIG. 8D. It is found that in the smoothed structure index Da, fluctuation due to the influence of noise exists, but a level difference between the flat part and the texture part becomes more apparent, and separation of the flat part from the texture part is more easily performed compared to the structure index D.

Figure 8E:
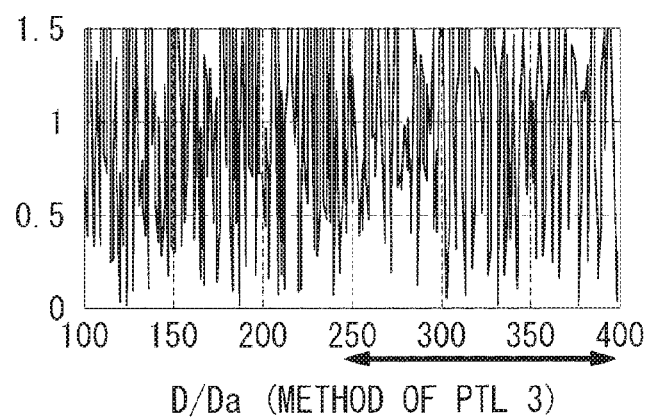
FIG. 8E is an explanatory diagram in which the noise reduction process based on the flatness index in the image processing apparatus according to the first embodiment of the present invention is compared with noise reduction by a conventional flatness index.

On the contrary, when the index of D/Da similar to PTL 3 is calculated, the calculated index becomes an index illustrated in FIG. 8E. Consequently, it is found that while low frequency fluctuation due to noise is not generated, a level difference between the flat part and the texture part disappears, and the index is not a suitable index from a viewpoint of the separation of the flat part from the texture part.

Figure 8F:
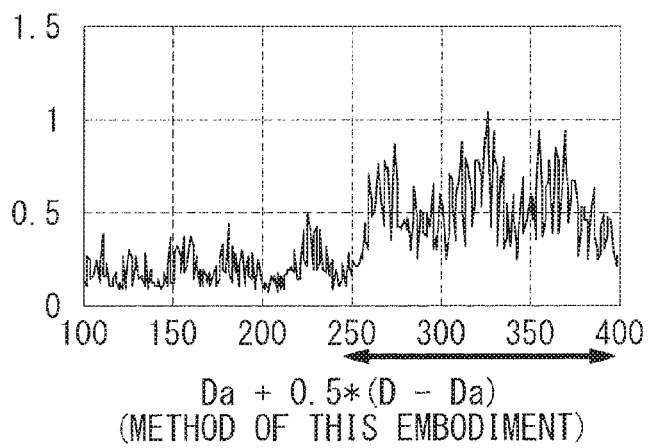
FIG. 8F is an explanatory diagram in which the noise reduction process based on the flatness index in the image processing apparatus according to the first embodiment of the present invention is compared with noise reduction by a conventional flatness index.

In the flatness index F in this embodiment, the high frequency and the low frequency of the structure index D are mixed such that the ratio of the low frequency is larger, and therefore the flatness index F becomes an index illustrated in FIG. 8F. Consequently, as shown in FIG. 8F, it is found that while the level difference between the low frequencies of the flat part and the texture part which appear in Da is maintained, the fluctuation of the low frequency is further mixed with the fluctuation of the higher frequency, so that low frequency unevenness of the index in both flat and texture parts are decreased.

Figure 9:
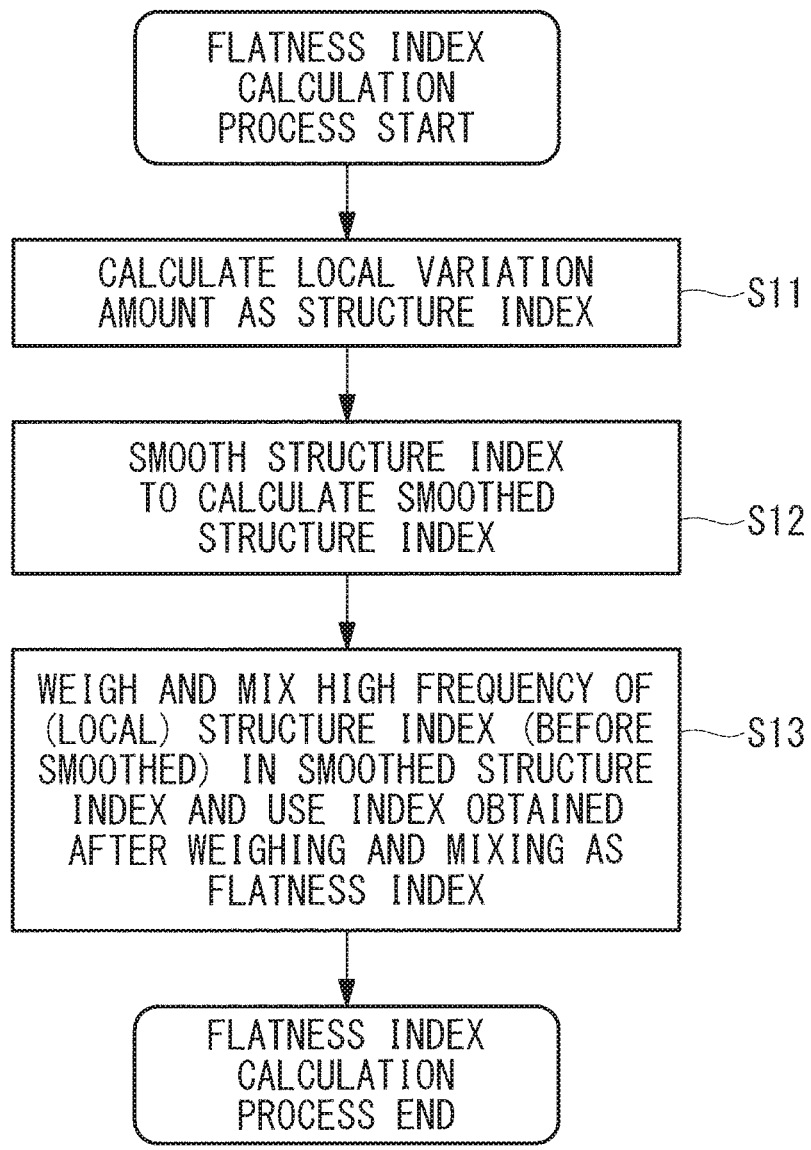
FIG. 9 is a flowchart illustrating a process of calculating a flatness index, in the image processing apparatus according to the first embodiment of the present invention.
Figure 10:
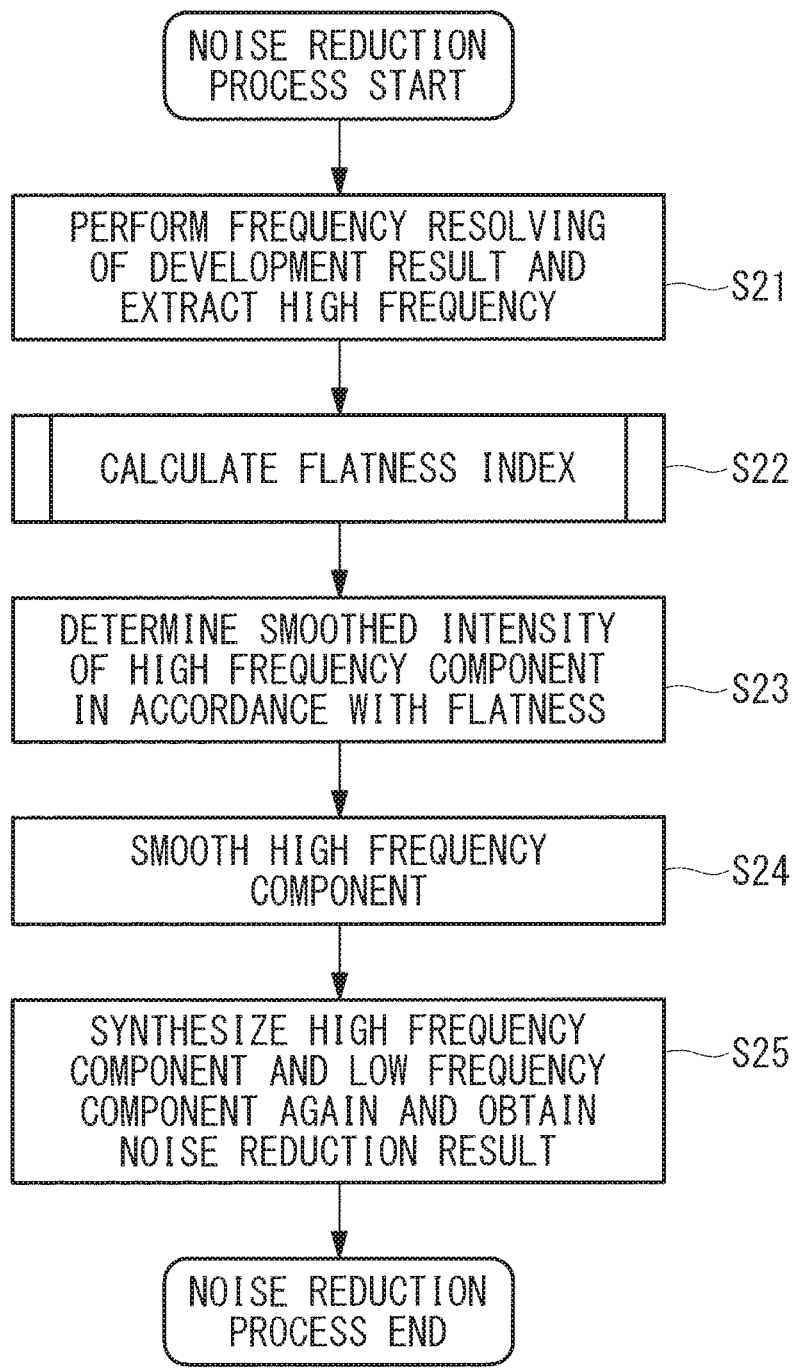
FIG. 10 is a flowchart of the noise reduction process in the image processing apparatus according to the first embodiment of the present invention.

The present invention is not limited to the above example, and a process by software according to flowcharts illustrated in FIG. 9 and FIG. 10 can be performed.

That is, as to the flatness index calculation, the unevenness of a local image is calculated as the structure index in Step S11 of FIG. 9 (Expression (1) or Expression (2)). Next, the structure indices are smoothed in Step S12, and the smoothed structure index is calculated (Expression (3)). Then, the flatness index is calculated by reflecting the high frequency space variation of the structure index in the smoothed structure index (specifically, weighing and mixing the high frequency component of the structure index before smoothed, or the like) in Step S13 (Expression (9)).

In Step S21 of FIG. 10, the frequency decomposition of an image being a development result is performed, and a high frequency is extracted (Expression (4) and Expression (5)). Next, in Step S22, the flatness index is calculated according to the flowchart of FIG. 9. The smoothed intensity of a high frequency component is determined in accordance with the flatness index in Step S23 (Expression (7) and Expression (8)). Then, the high frequency component is smoothed in Step S24, and the high frequency component and the low frequency component are finally synthesized again in Step S25, so that a noise reduction result is obtained (Expression (6)).

Second Embodiment

Hereinafter, a second embodiment of the present invention will be described. In the above first embodiment, the structure index D is calculated from an image before development (called RAW data, and including a case of a single plate (including only one color data in 1 pixel)). However, in this embodiment, the structure index calculation unit 11 calculates a luminance component from a color image developed by a developing unit 10, and a structure index D is calculated for the luminance component.

In a flatness index calculation unit 14, a flatness index F(x, y) is calculated by the following Expression (10) in place of Expression (9).

$$F(x,y)=\alpha*Da(x,y)-\beta*(D(x,y)-Da(x,y)) \qquad (10)$$

where $\alpha$ and $\beta$ each are a positive constant.

Herein, an advantage of using Expression (10) in place of Expression (9) will be described with reference to FIGS. 11A to 11H. FIGS. 11A, 11C, 11E, and 11G illustrate results of a case where a structure index corrected by Expression (9) is used, and are similar to FIGS. 7B, 7D, 7F, and 7H. Herein, when the preservation of a structure is focused in a noise reduction final result of FIG. 7G in a case where Expression (9) is used, it is found that a difference between parts where the structure is hardly broken and remains, illustrated by solid circle marks, and parts where the structure remains but is considerably broken, illustrated by dotted circle mark, is still large. This phenomenon can be described as follows.

(1)

In a case where correction is performed by Expression (9), at a part where D(x, y)>Da(x, y) is locally satisfied, F(x, y)>α*Da(x, y) is satisfied, whereas at the part where D(x, y)<Da(x, y) is locally satisfied, F(x, y)<α*Da(x, y) is satisfied.

(2)

Hence, coring is more unlikely to be caused at the part where D(x, y)>Da(x, y), and more likely to be caused at the part where D(x, y)<Da(x, y).

(3)

Both of the structure index, and high frequency amplitude (absolute value) obtained by, for example, Expression (4) and Expression (5) reflect the magnitude of spatial variation of a pixel value, and therefore are correlated with each other.

(4)

When the above (2) and (3) are combined, at a part where high frequency amplitude is originally locally larger than its surrounding part, the (local) structure index D(x, y) is also large, and D(x, y)>Da(x, y) is easily established, and therefore tendency of coring large high frequency amplitude at a small coring threshold value becomes stronger, and a high frequency is further more likely to remain.

(5)

Similarly to the above (4), at a part where high frequency amplitude is originally locally smaller than a part around the above part, the (local) structure index D(x, y) is also small, and D(x, y)<Da(x, y) is easily established, and therefore tendency of coring small high frequency amplitude at a large coring threshold value becomes stronger, and a high frequency is further more likely to be broken.

Figure 11A:
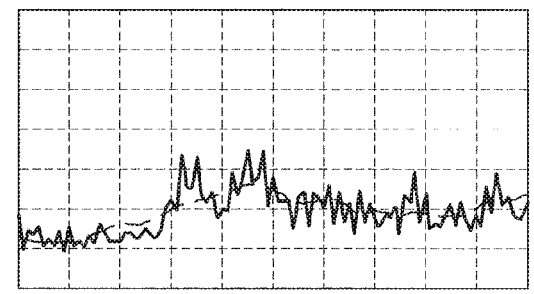
FIG. 11A is a diagram illustrating a process of a noise reduction controlled by a flatness index, in an image processing apparatus according to a second embodiment of the present invention.
Figure 11B:
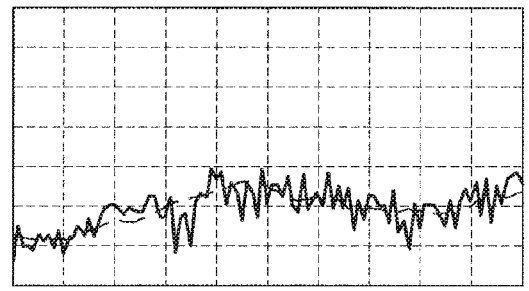
FIG. 11B is a diagram illustrating a process of a noise reduction controlled by a flatness index, in an image processing apparatus according to a second embodiment of the present invention.
Figure 11C:
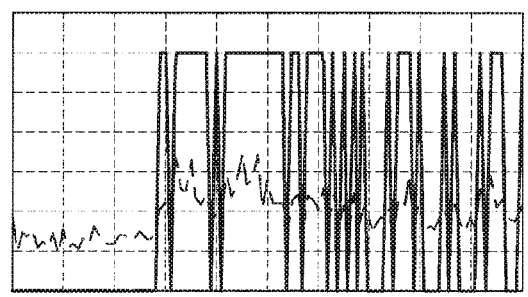
FIG. 11C is a diagram illustrating a process of a noise reduction controlled by a flatness index, in an image processing apparatus according to a second embodiment of the present invention.
Figure 11D:
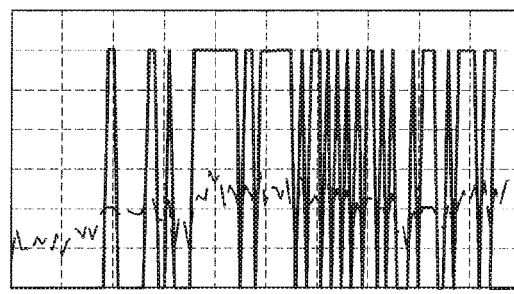
FIG. 11D is a diagram illustrating a process of a noise reduction controlled by a flatness index, in an image processing apparatus according to a second embodiment of the present invention.
Figure 11E:
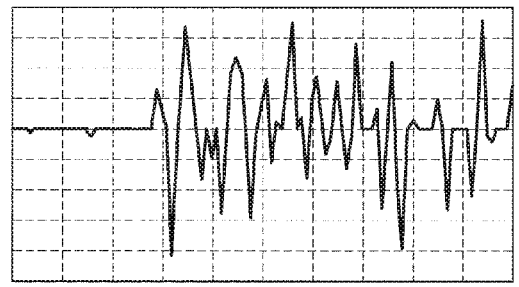
FIG. 11E is a diagram illustrating a process of a noise reduction controlled by a flatness index, in an image processing apparatus according to a second embodiment of the present invention.
Figure 11F:
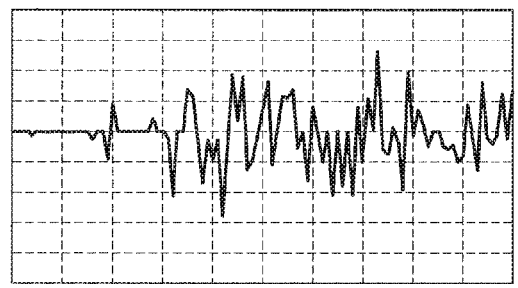
FIG. 11F is a diagram illustrating a process of a noise reduction controlled by a flatness index, in an image processing apparatus according to a second embodiment of the present invention.
Figure 11G:
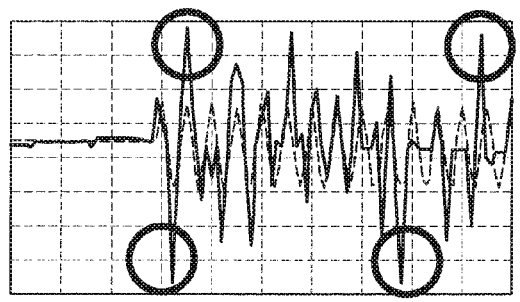
FIG. 11G is a diagram illustrating a process of a noise reduction controlled by a flatness index, in an image processing apparatus according to a second embodiment of the present invention.
Figure 11H:
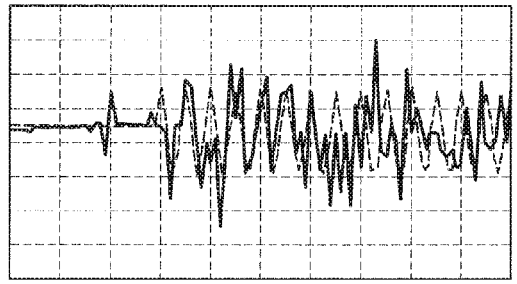
FIG. 11H is a diagram illustrating a process of a noise reduction controlled by a flatness index, in an image processing apparatus according to a second embodiment of the present invention.

Therefore, when the correction of the structure index is performed, such that F(x, y) becomes smaller at the part of D(x, y)>Da(x, y), and becomes larger at the part of D(x, y)<Da(x, y), synergistic effects described in (4) and (5) are cancelled out, and a difference of the structure preservation between the two parts becomes small, so that a more natural processing result is obtained. The correction expression of Expression (10) has this property, as demonstrated in FIG. 11H. FIG. 11H illustrates the result obtained by using the flatness shown in FIG. 11B, which is computed according to Expression (10). In FIG. 11H, the difference of the structure preservation between the flat and non-flat parts surely becomes smaller compared with the result shown in FIG. 11G.

When Expression (10) is further expanded, the following modification is considered.

$$F(x,y)=\gamma(Da(x,y))*Da(x,y)+\delta(Da(x,y))*D(x,y) \qquad (11)$$

where, $\gamma$ and $\delta$ each are a function.

In Expression (11), a manner of reflecting the high frequency of a structure index D before smoothed in a flatness index F can be changed in accordance with the magnitude of a smoothed structure index Da by the functions $\gamma$ and $\delta$. For example, as illustrated in FIG. 12, (A) $\gamma$(Da) is made to be negative only within a certain range of Da, so that it is possible to limit the effect that the difference of structure preservation among regions becomes small and the more natural processing result is obtained, to only in a low contrast part.

(B) When Da is large, $\gamma$ becomes small, and correction is performed such that F(x, y) approaches the structure index D, so that it is possible to obtain, for example, an effect capable of solving a problem that Da(x, y) becomes large at a flat part around the high contrast edge part which causes in the erroneous determination that there is a structure in the actually flat part.

Additionally, as another modification, it is possible to calculate like the following Expression (12).

$$F(x,y)=\text{clip\_maxmin}(\alpha*Da(x,y)-\beta*(D(x,y)-Da(x,y)),\\ Da(x,y)-T\text{min},Da(x,y)+T\text{max}) \qquad (12)$$

where, $\alpha$ and $\beta$ each are a positive constant.

As illustrated in Expression (12), it is effective to introduce a clip process. In Expression (12), clip_maxmin (x, tmin, tmax) is a function for restricting x to at least tmin and at most tmax (when x<tmin is satisfied, x is tmin, and when x>tmax is satisfied, x is tmax). Tmin and Tmax are adjusted, so that it is possible to restrict a flatness index F(x, y) so as not to be too small at a part where high frequency amplitude is locally larger than a part around the above part, and not to be too large at a part where high frequency amplitude is locally smaller than a part around the above part. As a result, it is possible to adjust the structure preservation at the part where the high frequency amplitude is locally too large or too small.

Thus, correction is performed such that a magnitude relation between the structure index before smoothed and the structure index after smoothed, and a magnitude relation between the flatness index and the structure index after smoothed are at least partially inverted, and the correction degree can be changed in accordance with the structure index after smoothed, so that more natural processing result is obtained.

From the above-described embodiments and modifications thereof, a following aspect of invention are derived.

An aspect of the present invention includes: a structure index calculation unit that calculates a structure index that is an index of magnitude of variation of a pixel value in a predetermined region around a target pixel of an input image, with respect to each target pixel; a high frequency component extraction unit that extracts a high frequency structure index that is a high frequency component of the structure index; a smoothing unit that calculates a smoothed structure index obtained by smoothing the structure indices, with respect to the each target pixel; a flatness index calculation unit that calculates a synthesis index obtained by synthesizing the smoothed structure index and the high frequency structure index, as a flatness index of the target pixel; and a noise reduction unit that performs a noise reduction process of the target pixel in accordance with the flatness index.

According to this aspect, the structure index calculation unit calculates the structure index that is an index of the magnitude of the variation of the pixel value in the predetermined region around the target pixel, and evaluates local unevenness around the target pixel. The smoothing unit calculates the smoothed structure index on the basis of this structure index. Herein, when the presence or absence of an edge of the target pixel or flatness is determined, erroneous determination due to noise can be relaxed by using the smoothed structure index in addition to the structure index. However, in a case where the smoothed structure index is used, when the determination is erroneously performed, the range becomes continuous, which may cause low frequency unevenness.

Therefore, the high frequency component extraction unit extracts the high frequency structure index that is the high frequency component, and the flatness index calculation unit calculates the flatness index of the target pixel by synthesizing the smoothed structure index and the high frequency structure index. Then, the noise reduction process of each target pixel is performed in accordance with this flatness index.

Consequently, the flatness index capable of accurately determining the presence or absence of a structure or an edge can be calculated even in a region which is erroneously determined as continuous flatness by the smoothed structure index. Accordingly, the noise reduction process is performed in accordance with this flatness calculation index, so that it is possible to perform the noise reduction process which is hardly influenced by erroneous determination due to noise while maintaining an edge, and achieves a natural appearance with no unevenness or the like.

In the above aspect, the flatness index calculation unit preferably increases a synthesis ratio of the high frequency structure index, as the structure index or the smoothed structure index increases.

Consequently, for example, even in a part where the precision of the smoothed structure index is lowered, such as a flat part near a high contrast edge part, it is possible to calculate a flatness index close to a structure index which is not smoothed, and therefore it is possible to calculate a flatness index which prevents erroneous determination.

In the above aspect, in a case where the structure index or the smoothed structure index is within a predetermined range, the flatness index calculation unit preferably calculates the flatness index by treating a synthesis ratio of the high frequency structure index as negative.

Consequently, it is possible to obtain an effect that the difference between structure remaining degrees becomes small and the more natural processing result is obtained, with respect to a specific region of the image, for example, a low contrast part where the structure index or the smoothed structure index becomes a predetermined threshold value or less.

In the above aspect, the flatness index calculation unit preferably calculates the flatness index such that a magnitude relation between the structure index and the smoothed structure index, and a magnitude relation between the flatness index and the smoothed structure index are inverted in at least a part of the target pixel.

Consequently, it is possible to prevent a difference in the remaining degree of the structure in an image obtained after the noise reduction process.

In the above aspect, the flatness index calculation unit preferably performs synthesis such that an absolute value difference between the flatness index and the smoothed structure index is in a predetermined range.

Consequently, it is possible to adjust the remaining degree of the structure of a part where high frequency amplitude is locally too large or too small compared to the periphery of this part.

In the above aspect, the flatness index calculation unit preferably calculates the flatness index of the target pixel according to following Expression (1), $$D'=\alpha A - \beta(D-A) \quad (1)$$

where D' denotes the flatness index, D denotes the structure index, A denotes the smoothed structure index, and $\alpha$ and $\beta$ each are a predetermined positive constant.

Consequently, it is possible to easily prevent the generation of a difference in the remaining degree of the structure in an image obtained after the noise reduction process.

In the above aspect, the flatness index calculation unit preferably synthesizes an index obtained by inverting a sign of the structure index, and the smoothed structure index.

Consequently, it is possible to easily prevent the generation of a difference in the remaining degree of the structure in an image obtained after the noise reduction process.

REFERENCE SIGNS LIST

10 developing unit
11 structure index calculation unit
12 high frequency component extraction unit
13 smoothing unit
14 flatness index calculation unit
15 noise reduction unit
101 imaging unit
102 RAM
103 image processing apparatus
104 recording unit

The invention claimed is:
1. An image processing apparatus configured to:
   calculate a structure index that is an index of magnitude of variation of pixel values in a predetermined region around a target pixel of an input image, with respect to each target pixel;
   extract a high frequency structure index that is a high frequency component of the structure index;
   calculate a smoothed structure index obtained by smoothing the structure indices, with respect to each target pixel;
   calculate a synthesis index obtained by synthesizing the smoothed structure index and the high frequency structure index, as a flatness index of the target pixel; and
   perform a noise reduction process of the target pixel in accordance with the flatness index.
2. The image processing apparatus according to claim 1, wherein, in calculating the flatness index, a synthesis ratio of the high frequency structure index is increased, as the structure index or the smoothed structure index increases.
3. The image processing apparatus according to claim 1, wherein in a case in which the structure index or the smoothed structure index is within a predetermined range, the flatness index is calculated by treating a synthesis ratio of the high frequency structure index as negative.

4. The image processing apparatus according to claim 1, wherein the flatness index is calculated such that a magnitude relation between the structure index and the smoothed structure index, and a magnitude relation between the flatness index and the smoothed structure index, are inverted in at least a part of the target pixels.

5. The image processing apparatus according to claim 1, wherein, in calculating the flatness index, synthesis is performed such that an absolute value difference between the flatness index and the smoothed structure index is in a predetermined range.

6. The image processing apparatus according to claim 1, wherein the flatness index of the target pixel is calculated according to following Expression (1):

$$D' = \alpha A - \beta(D-A) \tag{1}$$

where $D'$ denotes the flatness index, $D$ denotes the structure index, $A$ denotes the smoothed structure index, and $\alpha$ and $\beta$ are predetermined positive constants.

7. The image processing apparatus according to claim 1, wherein calculating the flatness index includes synthesizing an index obtained by inverting a sign of the structure index, and the smoothed structure index.

\* \* \* \* \*